Feb. 23, 1932.　　　I. L. WITHROW　　　1,846,537
CARRIAGE HOLDING DEVICE
Filed April 25, 1929
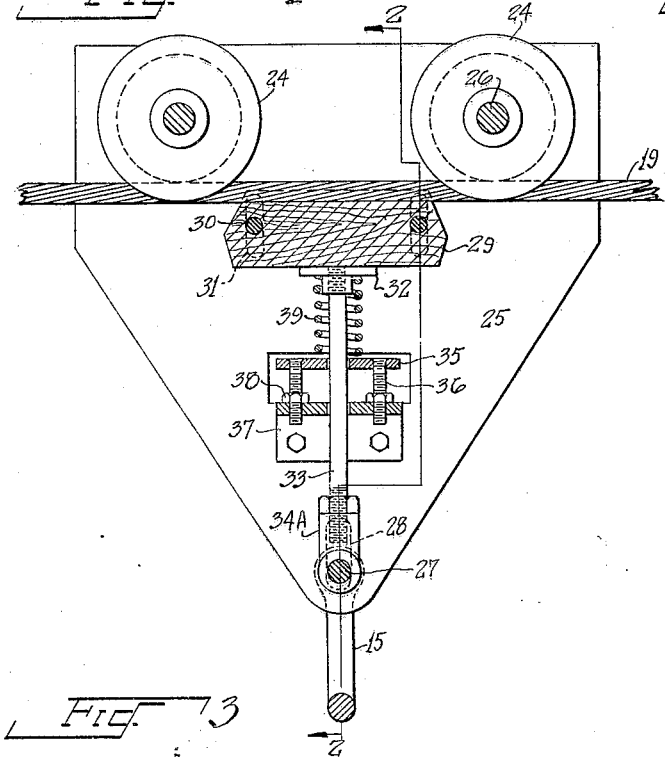
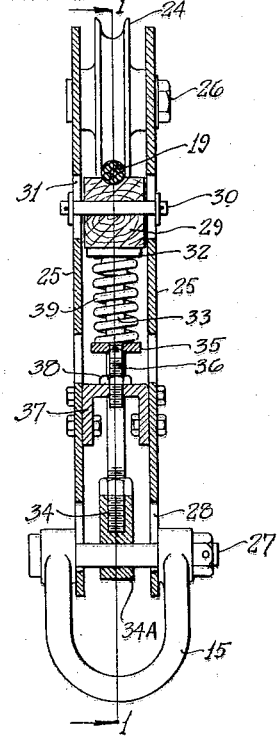
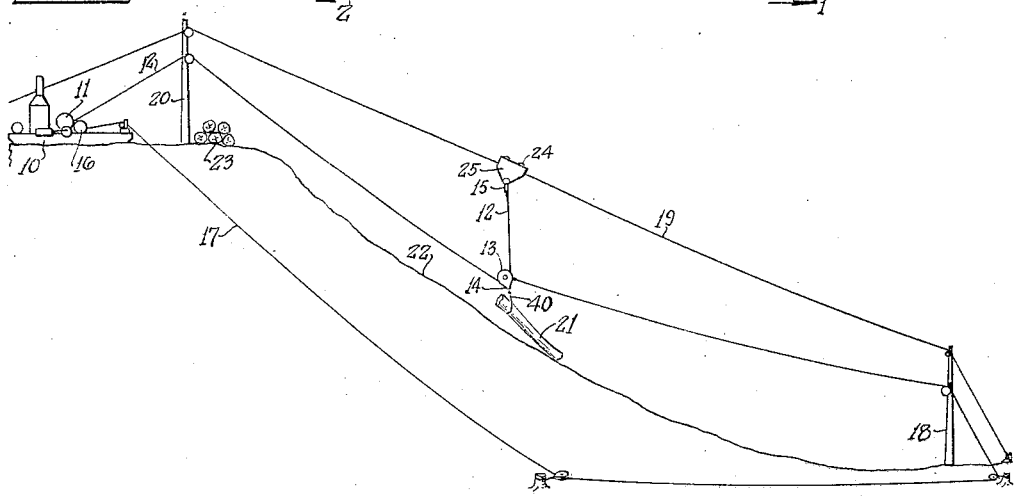
INVENTOR
I. L. WITHROW.
BY E. B. Birkenbeul.
ATTORNEY Patented Feb. 23, 1932

1,846,537

UNITED STATES PATENT OFFICE

IRA L. WITHROW, OF GRAND RONDE, OREGON, ASSIGNOR OF ONE-HALF TO WILLIAM A. PITTENGER, OF PORTLAND, OREGON

CARRIAGE HOLDING DEVICE

Application filed April 25, 1929. Serial No. 358,020.

This invention relates generally to the logging industry, and particularly to carriages for cableway logging.

The main object of this invention is to provide a carriage holding device which will prevent the carriage from running away in event the haul-in line should break, thereby eliminating the possibility of injuring bystanders, tearing out the spar trees, or otherwise injuring the rigging.

The second object is to facilitate the hauling of logs on steep upgrades by means of cableway carriages in instances where logs are deposited at the top of the grade, and in which it is ordinarily difficult to release the choker hooks when the logs are lowered to the ground in view of the fact that the carriage ordinarily runs backwards down hill.

These, and other objects, will become more apparent from the specification following as illustrated in the accompanying drawings, in which:

Figure 1 is a vertical section through the carriage take along the line 1—1 in Figure 2. Figure 2 is a broken vertical section taken through the carriage along the line 2—2 in Figure 1. Figure 3 is a diagrammatic view showing a logging operation in which the logs are being carried up a hill-side.

Similar numbers of reference refer to similar parts throughout the several views.

Referring in detail to the drawings, there is shown a common form of intergeared logging engine 10 having a haul-in drum 11 whose haul-in line 12 passes through a sheave 13 of a fall block 14 and is made fast to a clevis 15 of the carriage about to be described.

The logging engine 10 also has a haul-back drum 16 whose haul-back line 17 is carried in a round-about manner to the tail tree 18 from which it is led to the fall block 14 and secured.

The carriage about to be described is mounted on a standing line 19 which is suspended between the tail tree 18 and the head tree 20. This arrangement is commonly known in the industry as the North Bend system, in which the drums 11 and 16 may be driven independently or in unison. When lifting the end of the logs free from the ground it is necessary to wind up the haul-in line 12 while the haul-back line 17 is held stationary, or at least to wind up the line 12 more rapidly than the line 17 is being paid out. It will be seen that either of these actions will cause the fall block 14, with its attached logs 21, to rise from the ground 22. When the desired lift is secured the drums 11 and 16 are operated in unison, or rather one hauls in its line as rapidly as the other pays it out. When the logs 21 are brought to the pile 23, which in this instance is at the top of the hill, the load is dropped and, due to the incline of the standing line 19, the carriage runs down the hill as far as possible maintaining a sufficient tension on the chokers to make their release a difficult matter.

In order to overcome this difficulty the carriage is constructed as follows: On the line 19 are mounted the grooved wheels 24 which are tied together by the plate side frames 25 through which pass the bolts 26 which form the axles for the wheels 24. To the lower end of the frames 25 is attached the clevis 15 by means of a bolt 27 which passes through the slots 28 in the frames 25.

Between the frames 25 passes the standing line 19 upon which the wheels 24 ride. Between the frames 25 and under the standing line 19 is a brake shoe 29 of wood or other suitable material, preferably supported by two pins 30 which can move in the slots 31 in the side frames 25, which permit the travel of the shoe 29 toward or away from the line 19. The shoe 29 normally rests upon the head 32 of a push rod 33 whose lower end 34 is threaded into an eye 34—A through which passes the bolt 27. A lock nut on the end 34 engages the eye 34—A. The push rod 33 also passes loosely through a spring adjusting plate 35 which is supported by the two studs 36 which pass loosely through the bracket 37 which is mounted between the side frames 25. Adjusting nuts 38 on the studs 36 permit the position of the plate 35 to be adjusted for the purpose of regulating the tension on the spring 39, which is also placed on the rod 33 between the head 32 and the plate 35.

The operation of the device is as follows: The tension of the spring 39 having been adjusted, it is assumed that a load of logs has been picked up by the manipulation of the lines 12 and 17, which load must be borne by the clevis 15 whose pin or bolt 27 has a limited movement within the slot 28, which movement however is sufficient to compress the spring 39 sufficiently far to draw the brake shoe 29 away from the line 19, thereby permitting a free travel of the carriage.

Assuming now that the line 12 or its fastenings should become broken, it is clear that the logs 21 would immediately fall, together with the fall block 14, thereby removing almost completely the load which was previously suspended by the clevis 15. The spring 39 is now able to urge the brake shoe 29 into frictional engagement with the line 19 and thereby effectively prevent any considerable travel of the carriage before it is brought to a dead stop, instead of allowing it to run down the full length of the cableway at a terrific speed, which spells destruction for everything in its path.

We will now assume that no breakage has occurred and the load has been carried up hill to the pile 23 and permitted to rest at the unloading point, which would also remove the load from the spring 39, thereby causing the brake shoe 29 to grip the standing line 19 and hold the carriage against movement to enable the operator to release the logs from the chokers 40.

It will be understood that the weight of the fall block 14 and the portions of the lines 12 and 17 which are attached to or pass through the fall block 14 is in most instances sufficient to compress the spring 39 so as to release the brake shoe 29. If, however, at any time this is not sufficient, for example, after the load has been released, then it will be found necessary to hold back on the haul-in line 12 sufficiently to produce the same effect as if the fall block 14 were actually suspended, until the haul-back line 17 takes the carriage far enough out to actually permit the fall block to be suspended, after which the sag on the lines 12 and 17 and the weight of the fall block 14 will be sufficient to completely free the carriage.

Wear on the shoe 29 is taken up by adjusting the rod 33 with relation to the eye 34—A.

It is a well known fact that numerous changes may be made in the details of construction of this device, and while I do not claim to be the original inventor of carriage holding devices, I do intend to cover all such forms and modifications of this device as fall fairly within the appended claim.

I claim:

A cableway carriage consisting of a pair of side frames, a pair of grooved wheels mounted in said side frames, a horizontal brake shoe slidably mounted between and below said wheels, a clevis at the lower end of said frames having a bolt passing therethrough, said frames having slots therein adapted to receive said bolt in a manner to permit a limited movement thereon, a push rod between said clevis bolt and brake shoe having a head on the shoe-engaging end thereof, a spring under said head, and an adjustable support for said spring.

IRA L. WITHROW.